United States Patent [19]

Hess

[11] 4,155,644

[45] May 22, 1979

[54] PHOTOGRAPHIC EASEL FOR BORDERLESS PRINTS

[75] Inventor: Steven Hess, Rochester, N.Y.

[73] Assignee: Saunders Photo/Graphic, Inc., Rochester, N.Y.

[21] Appl. No.: 866,454

[22] Filed: Jan. 3, 1978

[51] Int. Cl.² ............................................. G03B 27/58
[52] U.S. Cl. ........................................ 355/72; 355/74
[58] Field of Search ................................... 355/72, 74

[56] References Cited

U.S. PATENT DOCUMENTS

| 2,256,894 | 9/1941 | Chadkin | 355/74 |
| 2,633,058 | 3/1953 | De Brouwer | 355/74 X |

*Primary Examiner*—Richard A. Wintercorn

*Attorney, Agent, or Firm*—Stonebraker, Shepard & Stephens

[57] ABSTRACT

A photographic easel for making borderless prints has a laterally adjustable bar positionable by bolts movable in a pair of parallel slots and is otherwise formed of a generally rectangular metal sheet having bent-up edges. A back and side edge are bent at an angle of about 10° from the vertical toward a central region of the sheet to form abutments for two adjacent edges of a sheet of print paper, and a front edge is bent up at an acute angle to the horizontal plane of the metal sheet to form a finger grip for manually positioning the easel. The bar is generally channel-shaped with a vertical edge and an inclined edge and is preferably reversible, and five support pads are secured to the underside of the sheet to uphold the corners and a central region above a support surface to provide clearance for the bar-retaining bolts.

4 Claims, 3 Drawing Figures

PHOTOGRAPHIC EASEL FOR BORDERLESS PRINTS

BACKGROUND OF THE INVENTION

Photographic easels for making borderless prints have been generally known for many years, and they involve adjustable bars having undercut edges for gripping and holding down the edges of a sheet of print paper so that the paper can be exposed all the way to its edges. The best prior art known to applicant is the De Brouwer U.S. Pat. No. 2,633,058, and commercial embodiments of borderless print easels have generally followed the De Brouwer suggestions including the bent-down legs along each side edge of the easel, but they have also used a pair of adjustable bars separately positionable in separate sets of parallel slots for holding down two opposite side edges of a sheet of print paper.

The invention involves recognition of a way of simplifying and economizing in the construction of a borderless print easel while simultaneously achieving convenience, reliability, durability, functional versatility, and ease of operation and adjustment.

SUMMARY OF THE INVENTION

The inventive photographic easel is for making borderless prints and has a laterally adjustable bar that is positionable by bolts in a pair of parallel slots. The easel is formed of a generally rectangular metal sheet normally oriented in a generally horizontal plane to have a front edge, a back edge, and opposite side edges. The back edge and one of the side edges are bent up at an angle of about 10° from the vertical toward a central region of the sheet to form inwardly inclined abutments for two adjacent edges of a sheet of print paper. The front edge is bent up at an acute angle from the horizontal plane to form a finger grip for manually positioning the easel, and the other side edge opposite the bent-up side edge is unbent and lies in the horizontal plane of the sheet. A plurality of support pads are secured to the underside of the sheet to uphold the sheet far enough above a support surface to provide clearance for bolts to move along the underside of the sheet, and the bar is generally channel-shaped with one side edge oriented generally vertically and another side edge angled outward from the vertical by about 10°. The angled side edge of the bar preferably extends upward farther than the vertical side edge of the bar, and five support pads are preferably arranged in the region of each corner of the sheet and in a central region of the sheet.

DRAWINGS

FIG. 1 is a plan view of a preferred embodiment of the inventive easel; and

FIGS. 2 and 3 are cross-sectional views of the easel of FIG. 1 taken respectively along the line 2—2 thereof and 3—3 thereof.

DETAILED DESCRIPTION

Figure 1:
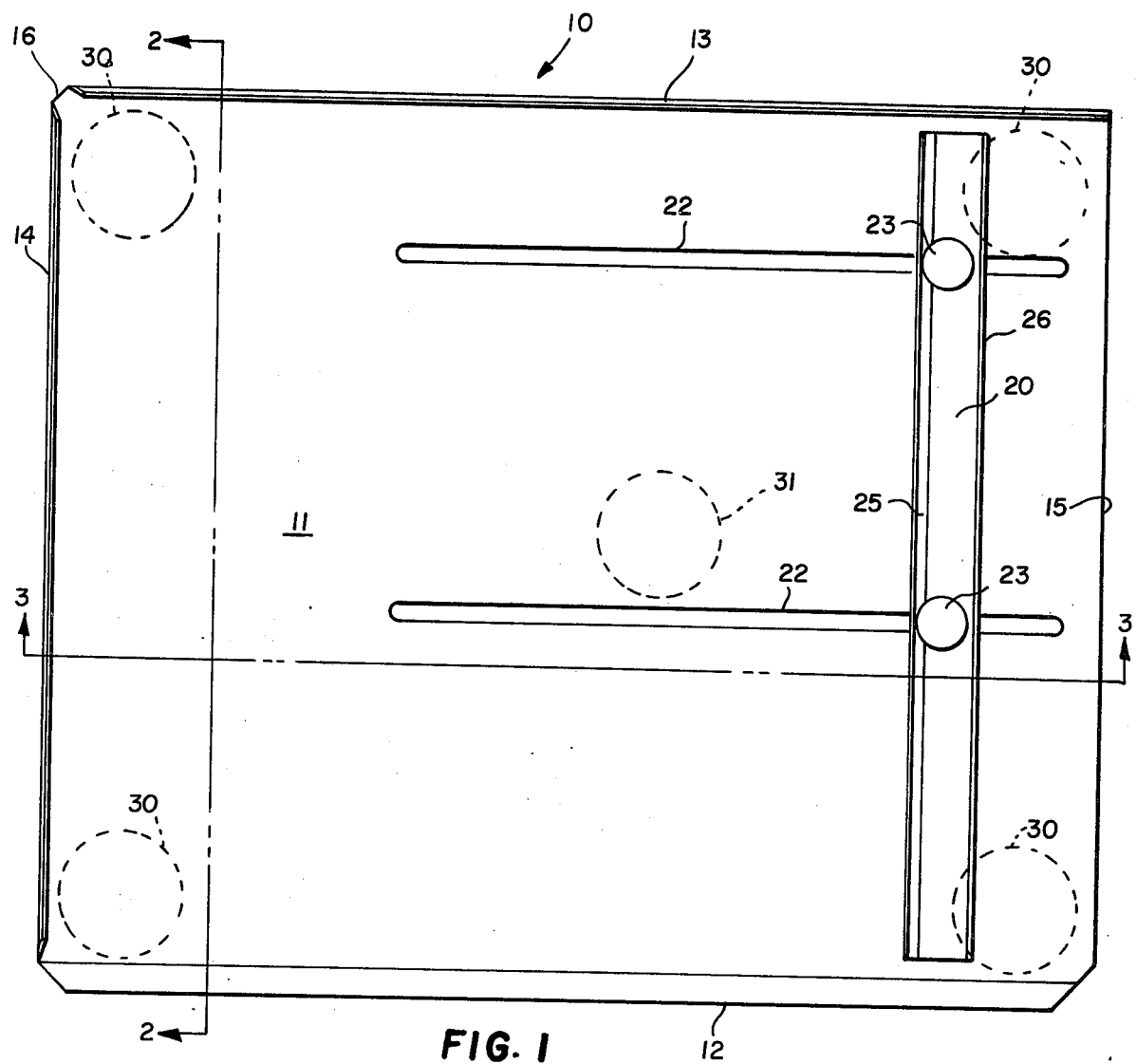
Figure 2:
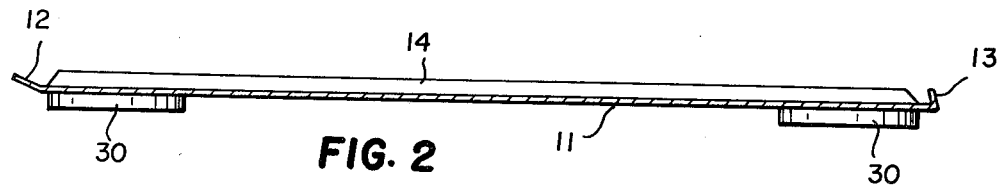

The preferred embodiment of the inventive easel 10 as shown in the drawings is simply constructed of a generally rectangular metal sheet 11. In use, sheet 11 is normally oriented in a generally horizontal plane with a front edge 12 facing toward the user, a back edge 13 farthest from the user, and opposite side edges 14 and 15. Back edge 13 and side edge 14 are separated by a cut-out corner notch 16 and are each bent upward and inward to angle from the vertical inward toward a central region of sheet 11 at an angle of about 10°. Bent-in edges 13 and 14 thus provide inwardly inclined abutments for two adjacent edges of a sheet of print paper and hold the edges of the print paper closely against the upper surface of sheet 11. Also, the preferred 10° angle of the inward bend of edges 13 and 14 from the vertical allows light from a projection printer to be incident on the edge of a sheet of print paper held closely against the upper surface of sheet 11 at the juncture or bending line between sheet 11 and edges 13 and 14. Edge 15, opposite bent-in side edge 14, is unbent and lies in the same horizontal plane as the central region of sheet 11.

Front edge 12 is bent upward by an acute angle from the horizontal plane of sheet 11 to form a finger grip for manually positioning easel 10. Bent-up edge 12 can be grasped by thumbs and fingers for conveniently moving easel 10 about without requiring finger contact with other parts of easel 10 or print paper on easel 10. The upward bend of front edge 12 affords extra clearance along the underside of sheet 11 for finger grip, and provides an edge that can be readily sensed tactically for accurately grasping easel 10 without accidentally touching the print paper.

Figure 3:
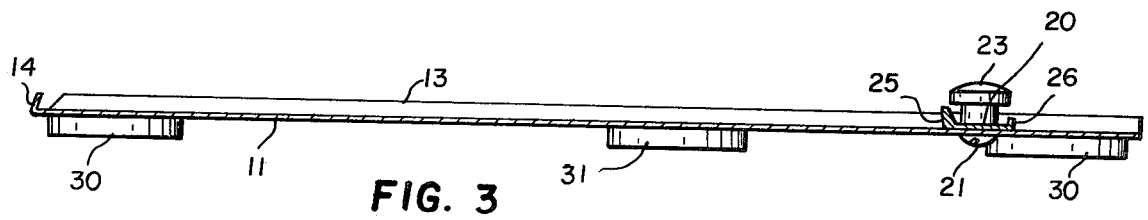

Adjustable bar 20 is preferably channel-shaped as illustrated and positionable to clamp or hold down a third edge of a sheet of print paper by adjustment of bolts 21 along the length of slots 22. The heads of bolts 21 are preferably arranged to engage the underside of sheet 11 as best shown in FIG. 3, and knobs 23 are preferred as nuts for bolts 21 to afford an easy finger grip for loosening and tightening bolts 21 to adjust bar 20.

One edge 25 of channel-shaped bar 20 is angled outward from the vertical by about 10° to hold an edge of a sheet of print paper closely against the upper surface of sheet 11 and still allow light to be incident on the extreme edge of the paper as previously explained for inwardly bent edges 13 and 14. The other edge 26 of channel-shaped bar 20 is preferably generally vertical as illustrated and preferably extends upward less than edge 25. The lower height or upward extent of vertical edge 26 of bar 20 not only saves material but also improves finger access to knobs 23.

A foot or support pad 30, preferably formed of a resilient material such as rubber, is secured to the underside of sheet 11 in the region of each corner to uphold sheet 11 above a support surface. Pads 30 are preferably glued to the underside of sheet 11 and are thick enough or high enough to afford clearance for the heads of bolts 21 to move freely along the underside of sheet 11 as they are adjusted along the length of slots 22. Another foot or pad 31 is secured to the underside of sheet 11 in a central region of sheet 11 to provide additional support whenever easel 10 is positioned so that some of the corner pads 30 do not engage a support surface. Locating pad foot 31 in a central region of sheet 11 insures three point stable support contact between pad 31 and a pair of pads 30 for any practical positioning of easel 10 during use.

Bar 20 and slots 22 are preferably arranged symmetrically so that bar 20 can be reversed to have edge 26 face inward. This is convenient for positioning the edge of a glass plate against edge 26 of bar 20 to hold imaged material under a glass plate for camera copying. Normally, however, inclined or angled edge 25 of bar 20 faces inward holding down the edge of a sheet of print paper as explained above.

I claim:

1. A photographic easel for making borderless prints, said easel having a laterally adjustable bar positionable by bolts in a pair of parallel slots and said easel comprising:

(a) a generally rectangular metal sheet normally oriented in a generally horizontal plane to have a front edge, a back edge, and opposite side edges;

(b) said back edge and one of said side edges being bent up at an angle of about 10° from the vertical toward a central region of said sheet to form inwardly inclined abutments for two adjacent edges of a sheet of print paper;

(c) said front edge being bent up at an acute angle from said horizontal plane to form a finger grip for manually positioning said easel;

(d) the other of said side edges opposite said bent-up side edge being unbent and lying in said horizontal plane;

(e) a plurality of support pads secured to the underside of said sheet to uphold said sheet far enough above a support surface to provide clearance for said bolts to move along said underside of said sheet; and (f) said bar being generally channel-shaped with a flat bottom and an open top and with one side edge generally vertical and another side edge angled outward from the vertical by about 10°.

2. The easel of claim 1 wherein said angled side edge of said bar extends upward farther than said vertical side edge of said bar.

3. The easel of claim 1 wherein one of said support pads is arranged in the region of each corner of said sheet, and another of said support pads is arranged in a central region of said sheet.

4. The easel of claim 3 wherein said angled side edge of said bar extends upward farther than said vertical side edge of said bar.

* * * * *